April 8, 1969     A. C. JERMYN     3,436,829

DIE PIN SETTER

Filed April 8, 1968

ARTHUR C. JERMYN
INVENTOR.

BY *Lloyd F. Seebach*

AGENT

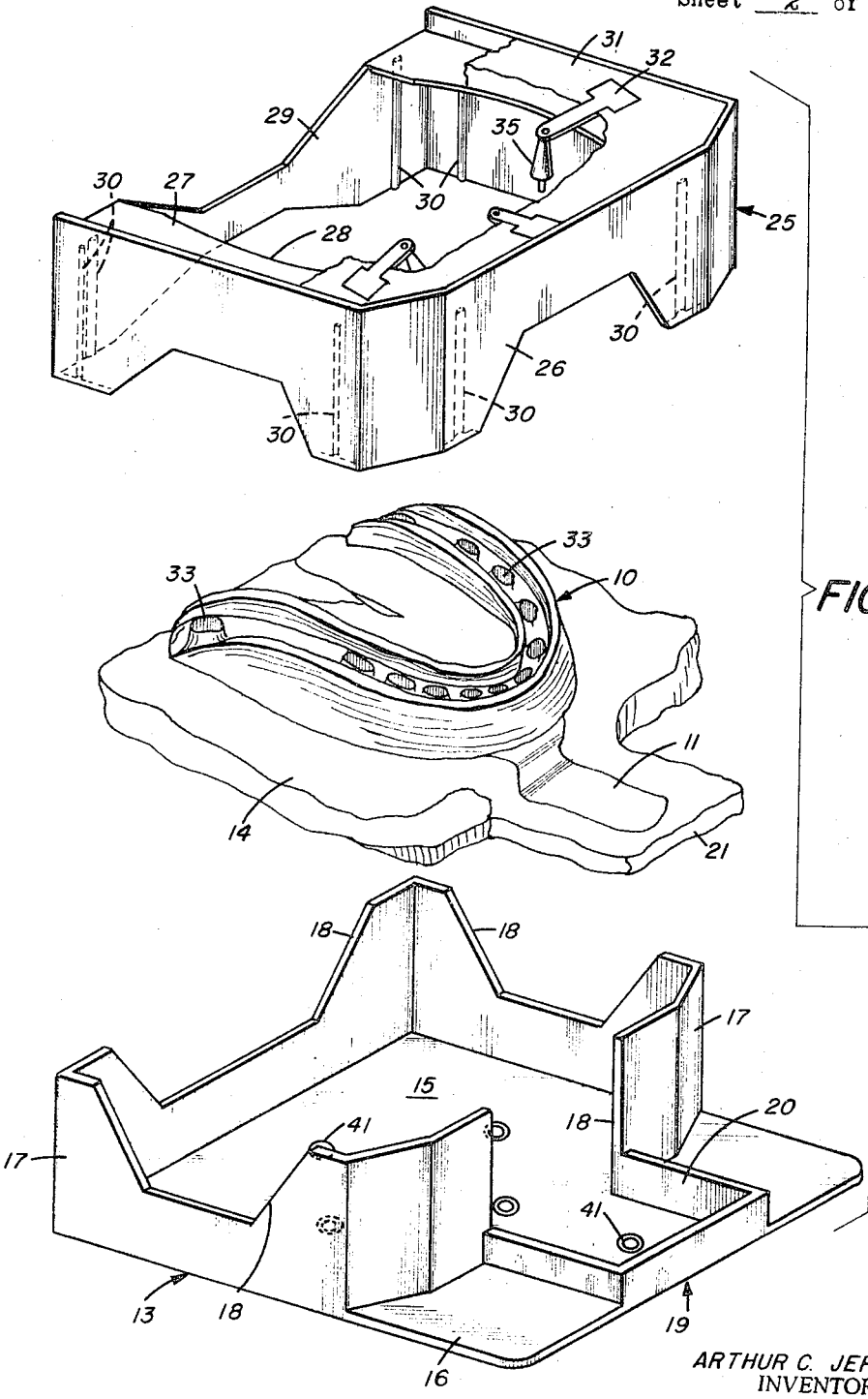

United States Patent Office 3,436,829
Patented Apr. 8, 1969

3,436,829
DIE PIN SETTER
Arthur C. Jermyn, 240 Danbury Circle N.,
Rochester, N.Y. 14618
Filed Apr. 8, 1968, Ser. No. 719,655
Int. Cl. A61c 13/00
U.S. Cl. 32—40                               8 Claims

ABSTRACT OF THE DISCLOSURE

A device comprising a base member on which an impression is positioned and a removable member which overlies the base member and comprises a wall that telescopically engages the base member and is provided with an inwardly extending ledge which overlies the surface of the base member and defines an opening through which the impression is accessible. The ledge forms a support for a tacky, pliable material for receiving a holder for a pin which is embedded in the layer of tacky material at the proper angle to position the pin relative to the axis of a tooth cavity in the impression therebelow.

Field of the invention

The present invention relates to a die pin setter for use in the making of a dental restoration, such as a cap for a tooth or an inlay, and more particularly to a device for permitting the axis of a handling pin to be oriented with respect to the axis of a tooth cavity in an impression and for holding the pin in such position while the material that is used to make a model of the impression hardens.

Description of the prior art

In the making of a dental restoration for a tooth, or an inlay, the tooth is usually prepared and then reduced in size to the form which it is to have for receiving the restoration. An impression is then taken of at least the tooth or teeth concerned by means of a plastic material and a cast made of the impression for forming an equivalent of the teeth and particularly the tooth that is to receive the restoration. This is accomplished by positioning the impression so that a pin can be placed within one or more of the tooth impressions to provide a means for holding the stone die of the model while the "wax-up" of the tooth is being made or formed.

In the prior art, such a pin is usually placed in the tooth impression in substantially a perpendicular relationship to the plane on which the impression rests. When so positioned, the pin is not necessarily oriented with respect to the tooth axis but does provide a direct tooth relationship when the stone model is cut and separated to facilitate the "wax-up" of the tooth. It has been attempted to provide proper orientation of a pin in an impression by a device in which the pin, in effect, is universally mounted on a support member arranged over the impression so that proper orientation of the pin is attained. However, the holder for the pin is usually so constructed that several clamping devices must be released and reset in order to effect the desired orientation of the pin. This type of device presents not only a time consuming operation, but the parts comprising the pin holder are of such size that the releasing and the resetting operations are difficult to perform with any efficiency or accurate orientation of the pin.

Summary of the invention

The primary object of the present invention is to provide a device for permitting the instantaneous and accurate setting of a die pin with respect to the axis of a tooth cavity in an impression.

Another object of the present invention is to provide a device for accurately orienting the axis of a die pin relative to the axis of a tooth cavity in an impression without the necessity for adjusting a pin holder to attain the properly oriented position of the pin.

Still another object of the invention is to provide a device for orienting the axis of a die pin relative to the axis of a tooth cavity in an impression which permits the pin to be removed from the cavity and accurately relocated relative thereto.

These and other objects and advantages of the invention will be apparent to those skilled in the art by the description which follows.

The above objects of the invention are attained by a device comprising a base member and a removable member which overlies the base member and on which the holder for a pin can be removably mounted. The base member comprises a surface on which the impression is positioned and a vertically extending wall which forms a general enclosure about the impression. The removable member comprises a wall that telescopically engages the base member and an inwardly extending ledge which overlies the surface of the base member and defines an opening through which the impression is accessible. The ledge forms a support for a tacky, pliable material for receiving the holder for the pin. The ledge also establishes a spaced relation between the ledge and the surface of the base member. The impression is positioned on the surface of the base member and the holder for the pin is embedded in the layer of tacky material at the proper angle to position the pin relative to the axis of the tooth cavity therebelow. The base member is provided with means for relocating the impression in the same position relative to the opening formed by the ledge. From the detailed description which follows, it will be evident to those skilled in the art that the device for orienting the axis of a pin relative to a tooth cavity in an impression provides an easy and effective way for properly orienting and holding the pin in position while the die stone is poured.

Reference is now made to the accompanying drawings wherein like reference numerals designate like parts and wherein:

FIG. 3 is an exploded perspective view showing the various elements comprising the device of the invention;

Figure 1:
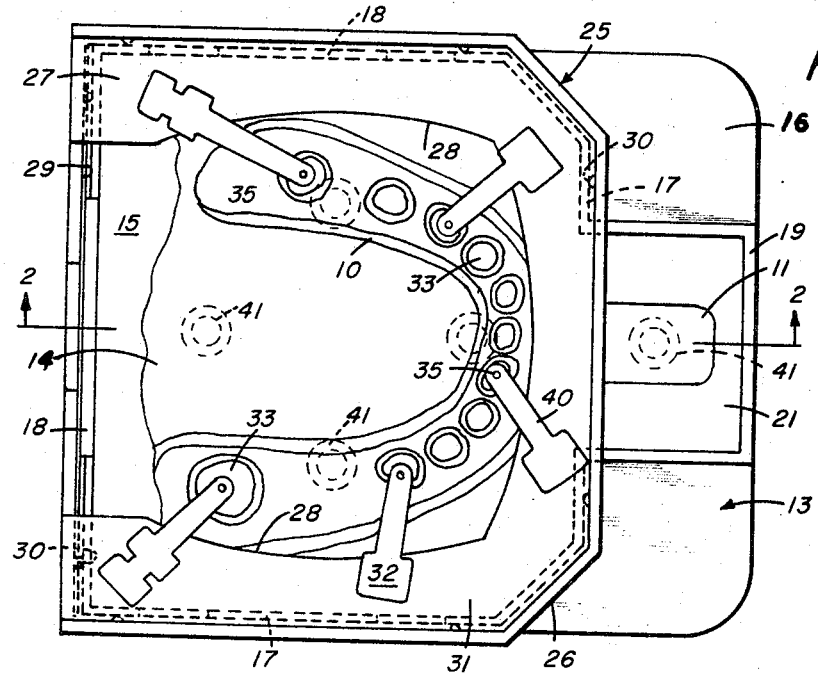
FIG. 1 is a plan view in accordance with the invention and shows the relation of the various parts and the location of the impression relative to the ledge for supporting the die pin.

With particular reference to FIG. 3, an impression 10 is mounted on an impression tray 11 in a well-known manner. The surface 15 of the base plate 16 can first be sprayed with a silicone that prevents plaster from adhering to said surfaces. A mound 14 of plaster, modeling clay or similar material, is then placed on the surface 15 and the tray 11 is carefully seated in the plaster, the impression 10 being carefully positioned and generally centered.

A base member 13 comprises the base plate 16 having the surface 15 and a vertically extending wall designated by the numeral 17 which is provided with side notches or openings 18 for permitting easy access to the impression 10 for making any adjustments that might be necessary. The front end 19 of the base member 13 is provided with a recess 20 for receiving the plaster tongue 21 in which a portion of tray 11 is embedded. The height of wall 17 is such that sufficient distance is provided between a removable member 25 and the base member 13 when they are in an assembled relation.

The removable member 25 comprises a wall 26 which is shaped to conform substantially with the wall 17 of the base member 13. The wall 26 is provided with an inwardly extending ledge 27 which forms an opening 28 of a size that is sufficient to expose the impression 10, as shown in FIG. 1. The inner surface 29 of wall 25 is provided with a plurality of ribs 30 that are spaced substantially as shown in FIG. 3. The ribs 30 engage corresponding surfaces of wall 17 of the base member 13 when the removable member is positioned on the base member in a telescoping relationship. With this arrangement, a minimum amount of surface area is used to obtain and maintain alignment of the removable member 25 and the base member 13 and movement of these members relative to each other can be accomplished with very little effort due to the relatively little friction therebetween.

Figure 2:
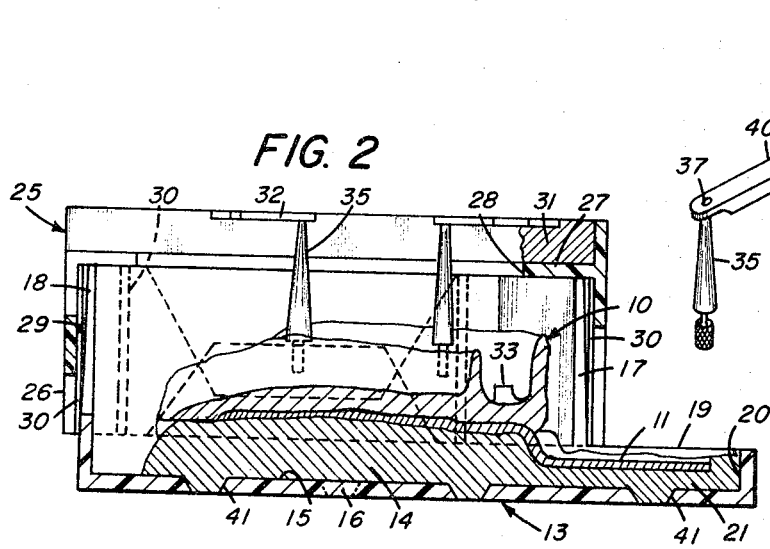
FIG. 2 is a vertical section taken substantially along line 2—2 in FIG. 1.

The ledge 27 as shown in FIG. 3 extends from three sides of the wall 25 which forms a generally rectangular member. The ledge 27 carries a layer of pliable, plastic material 31, such as modeling compound, for receiving a pin holder 32. In an assembled relationship as shown in FIGS. 1 and 2, the wall 25 of the removable member is spaced from the wall 17 by the ribs 30 and the top of wall 17 engages the bottom of ledge 27 to position the ledge in a spaced relation relative to the surface 15 and the impression 10. This latter relationship is best shown in FIG. 2. Also, it will be noted in FIG. 1 that the opening 28 is such that all of the tooth cavities 33 in impression 10 are exposed to such an extent relative to ledge 27 that a pin 35 can be oriented relative to any one of the tooth cavities and that a pin can be oriented with respect to each of several such cavities.

Figure 5:
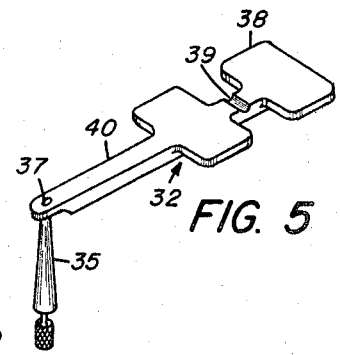
FIG. 5 is an enlarged detailed perspective view of the pin and its holder.

With reference to FIG. 5, the pin 35 is retained in the holder 32 by pressing the end 36 into a mounting hole 37 in holder 32. The shape of holder 32 is such that it can be shortened, if necessary, by breaking off the rear wing 38 at notch 39, depending on the position the holder will assume when positioned on ledge 27 and embedded in the material 31. The holder 32 is made of a plastic material which permits the rear wing 38 to be readily broken and at the same time permits the extending end 40 to be bent at an angle to orient its pin at an angle corresponding to that of the axis of the tooth cavity.

After the impression has been made and mounted on the tray 11, it is ready to be positioned on the surface 15 of the base member 13. However, before the impression is positioned in the base member 13, plaster or a modeling compound 16 is first placed on the surface 15 and the impression 10 and tray 11 are pressed into this material for retaining it in position, the impression being properly centered so as to be accessible through the opening 28 of removable member 25. It will be noted in FIGS. 1 and 2 that the surface 15 of base plate 16 is provided with holes 41 into which the plaster molds to provide a means for properly positioning the plaster and impression upon relocation in the base member 13.

After the impression has been so positioned, the removable member 25 is placed over the base member 13 and the ribs 30 engage the walls 17 so that the removable member 25 slidably and telescopically engages base member 13. The removable member 25 is properly positioned when the underside of ledge 27 engages top edge of wall 17.

Figure 4:
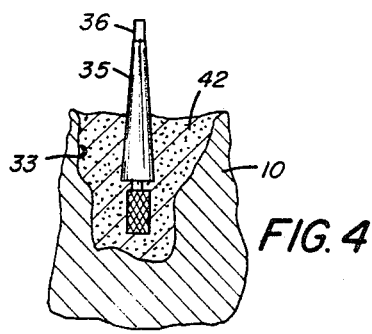
FIG. 4 is a detailed sectional view through a cavity in the impression showing the manner in which a die pin is retained in the cavity by the die stone.

The pin 35 is mounted in the holder 32 and normally extends therefrom at right angles as shown in FIG. 5. The holder is then positioned on the modeling compound 31 with the pin extending into a cavity 33 and with its axis oriented with respect to the axis of the tooth cavity. The proper orientation of the pin axis can be accomplished merely by pressing down on the holder and imbedding it in the modeling compound at the desired angle with any change that may be necessary being readily made merely by applying pressure to the holder at the proper point for changing its position in the modeling compound. As shown in FIG. 1, a pin can be oriented with respect to each of a number of different cavities in the impression. As described above, the holder 32 can be shortened by removing the rear wing 38 and the extension 40 of the holder can be angled merely by softening the plastic enough to bend the extension with the fingers. With a pin properly oriented with respect to each of a number of cavities 33, the removable member 25 is withdrawn and a die stone 42 is then poured and vibrated into the impression. With the impression filled with the stone to the proper height, such as in FIGURE 4, the removable member 25 is replaced so that the die pins positioned relative to one or more of the cavities 33 penetrate into the soft stone in the preset position. When the stone has set completely, the holders 32 are carefully removed from their respective pins 35. The removable member 25 is again removed from base member 13 and the stone model is then removed from the impression and trimmed for the "wax-up" of the cap. In some instances a second layer of stone may be poured and, after it has hardened, the resulting model of the tooth and pin is then cut out and used for "wax-up" of the cap.

It can be readily appreciated that the device described hereinabove provides a quick and efficient way of properly orienting the axis of a die pin relative to a tooth cavity in an impression. Further, the structure of the device is such that the parts can be readily assembled and separated and then reassembled with assurance that all parts will be returned to or will assume their original positions.

I claim:

1. A device for orienting the axis of a pin extending normal to a holder therefor in accordance with the axis of a tooth cavity as formed in an impression thereof, the combination comprising:

a base member having a surface on which said impression is positioned; and a removable member overlying said base member and having an inwardly extending ledge spaced from and generally parallel to the surface of said base member; said ledge defining an opening generally larger than said impression through which the latter is accessible and being provided with a pliable material for removably supporting the holder of said pin in a position in which the axis of the pin is oriented relative to the axis of said tooth cavity.

2. A device in accordance with claim 1 wherein said base member includes means for supporting said removable member and for maintaining said ledge in a predetermined relation spacewise from said surface.

3. A device in accordance with claim 1 wherein said base member includes means for locating said impression relative to said opening when said impression is positioned on said surface.

4. A device in accordance with claim 1 wherein said base member is telescopically received by said removable member.

5. A device in accordance with claim 1 wherein said pliable material is a modeling compound.

6. A device for orienting the axis of a pin extending normal to a holder therefor in accordance with the axis of a tooth cavity as formed in an impression thereof, the combination comprising:

a base member having a planar surface for supporting said impression and a wall extending normal to said surface and generally forming an enclosure about said surface;

a removable member having a wall that telescopically engages the wall of said base member and an inwardly extending ledge overlying said surface and defining an opening generally larger than said impression through which the latter is accessible, said ledge engaging the end of the wall of said base member for maintaining said ledge in a spaced and generally parallel position relative to said surface; and a layer of tacky, pliable material carried by said ledge for receiving the holder of said pin, the holder being adjustably impressed in said material for maintaining the axis of the pin in an oriented position relative to the axis of the tooth cavity.

7. A device in accordance with claim 6 wherein said impression is removable from said surface and said base member includes means for relocating said impression in substantially the same position relative to said opening.

8. A device in accordance with claim 6 wherein said material is a modeling compound.

References Cited

UNITED STATES PATENTS

| | | | |
|---|---|---|---|
| 2,836,849 | 6/1958 | Humphrey | 18—5.7 |
| 2,851,728 | 9/1958 | Spalton et al. | 18—34.1 |
| 3,277,576 | 10/1966 | Kraft | 32—40 |

ROBERT PESHOCK, *Primary Examiner.*

U.S. Cl. X.R.

18—5.7, 34.1